United States Patent
Kotani et al.

(10) Patent No.: US 9,147,396 B2
(45) Date of Patent: Sep. 29, 2015

(54) VOICE RECOGNITION DEVICE AND VOICE RECOGNITION METHOD

(71) Applicant: PANASONIC CORPORATION, Osaka (JP)

(72) Inventors: Junichi Kotani, Osaka (JP); Tomohiro Koganei, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 141 days.

(21) Appl. No.: 14/068,087

(22) Filed: Oct. 31, 2013

(65) Prior Publication Data

US 2014/0288930 A1   Sep. 25, 2014

(30) Foreign Application Priority Data

Mar. 25, 2013   (JP) ................................. 2013-061417

(51) Int. Cl.
*G10L 15/00* (2013.01)
*G10L 21/00* (2013.01)
*G10L 25/00* (2013.01)
*G10L 15/22* (2006.01)

(52) U.S. Cl.
CPC ...................... *G10L 15/22* (2013.01)

(58) Field of Classification Search
CPC ..... G06F 3/167; G06F 3/04842; G06F 3/048; G06F 3/14; G10L 15/22; G10L 17/22; G10L 25/48; G10L 2015/223; H04L 41/22
USPC ........................ 704/235, 243, 270, 270.1, 275
See application file for complete search history.

(56) References Cited

U.S. PATENT DOCUMENTS

| | | | | |
|---|---|---|---|---|
| 5,795,228 A * | 8/1998 | Trumbull et al. | ............... | 463/42 |
| 6,868,045 B1 * | 3/2005 | Schroder | ........................ | 367/198 |
| 6,959,095 B2 * | 10/2005 | Bakis et al. | .................... | 381/122 |
| 7,149,691 B2 * | 12/2006 | Balan et al. | .................... | 704/270 |
| 7,822,213 B2 * | 10/2010 | Choi et al. | ........................ | 381/92 |
| 7,885,818 B2 * | 2/2011 | Vignoli | ........................ | 704/275 |
| 8,237,770 B2 * | 8/2012 | Kenoyer et al. | ............. | 348/14.08 |
| 2002/0072912 A1 | 6/2002 | Yen et al. | | |
| 2003/0095212 A1 | 5/2003 | Ishihara | | |
| 2009/0110225 A1 * | 4/2009 | Kim | ................ | 381/356 |
| 2010/0016052 A1 * | 1/2010 | Gagner et al. | .................. | 463/16 |
| 2010/0020951 A1 * | 1/2010 | Basart et al. | ............. | 379/142.01 |
| 2010/0225471 A1 * | 9/2010 | Kawamoto et al. | ...... | 340/539.13 |
| 2011/0054891 A1 * | 3/2011 | Vitte et al. | .................... | 704/233 |

FOREIGN PATENT DOCUMENTS

| | | |
|---|---|---|
| JP | 2003-219201 | 7/2003 |
| JP | 2004-505327 | 2/2004 |
| JP | 2011-118822 | 6/2011 |
| WO | 02/11122 | 2/2002 |

\* cited by examiner

*Primary Examiner* — Edgar Guerra-Erazo
(74) *Attorney, Agent, or Firm* — Wenderoth, Lind & Ponack, L.L.P.

(57) ABSTRACT

The voice recognition device according to the present disclosure includes a communication interface that communicates with an external device, a first microphone that collects sound to produce audio data, and a controller that analyzes the audio data produced by the first microphone, determines contents of a designation corresponding to an analysis result, and then controls its own device based on a determination result, and yet controls its own device to urge a user to use the external device when the contents of the designation corresponding to the analysis result cannot be determined.

8 Claims, 7 Drawing Sheets

FIG. 7

```
Noise make recognition unavailable.
Please select one from the following mobile terminals connected to the device via
wireless LAN

|    1.ABC4    |
                        |    2. ABC5   |
                        |    3.DEF2    |
```

VOICE RECOGNITION DEVICE AND VOICE RECOGNITION METHOD

BACKGROUND OF THE INVENTION

1. Field of the Invention

The present disclosure relates to a voice recognition device and a voice recognition method.

2. Description of the Related Art

Unexamined Japanese Patent Publication No. 2011-118822 discloses a television device. This television device collects surrounding sound. The television device receives an audio signal from a mobile phone. The television device extracts an operation instruction based on an audio signal based on the collected voice and the received audio signal.

SUMMARY OF THE INVENTION

An object of the present disclosure is to provide a voice recognition device that controls its own device by accepting a designation made by voice from a user, wherein even in a situation in which voice recognition cannot be accurately performed, an alternative means can be recommended for the user.

In order to achieve the above object, the voice recognition device according to the present disclosure includes a communication interface that communicates with an external device, a first microphone that collects sound to produce audio data, and a controller that analyzes the audio data produced by the first microphone, determines contents of a designation corresponding to an analysis result, and then controls its own device based on a determination result, and yet controls its own device to urge a user to use the external device when the contents of the designation corresponding to the analysis result cannot be determined.

A voice recognition method according to the present disclosure includes communicating with an external device, collecting sound to produce audio data, analyzing the audio data to determine contents of a designation corresponding to an analysis result, and then controlling the device based on a determination result, and yet, urging a user to use the external device when the contents of the designation corresponding to the analysis result cannot be determined.

According to the present disclosure, there is provided a voice recognition device that controls its own device by accepting a designation made by voice from a user, and can recommend an alternative means to the user even in a situation in which voice recognition cannot be accurately performed.

BRIEF DESCRIPTION OF THE DRAWINGS

FIG. 2 is a flow chart for explaining an initial operation of a television device when the device is turned on;

FIG. 7 is a schematic diagram for explaining an example of a display screen of the television device according to the other embodiment.

DETAILED DESCRIPTION OF THE PREFERRED EMBODIMENTS

Embodiments will be described below with reference to the accompanying drawings as necessary. An excessively detailed description may not be made. For example, a detailed explanation of generally-known facts and an overlapping explanation of substantially the same configuration may not be made. This is to avoid the following explanation from being unnecessarily redundant and to allow the persons skilled in the art easy to understand the explanation.

The present inventor(s) provides the accompanying drawings and the following explanation to allow the persons skilled in the art to sufficiently understand the present disclosure, and does not intend to limit the concept described in scope of claims by the accompanying drawings and the following explanation.

First Embodiment

A first embodiment will be described below with reference to the accompanying drawings.

[1-1. Outline]

Figure 1:
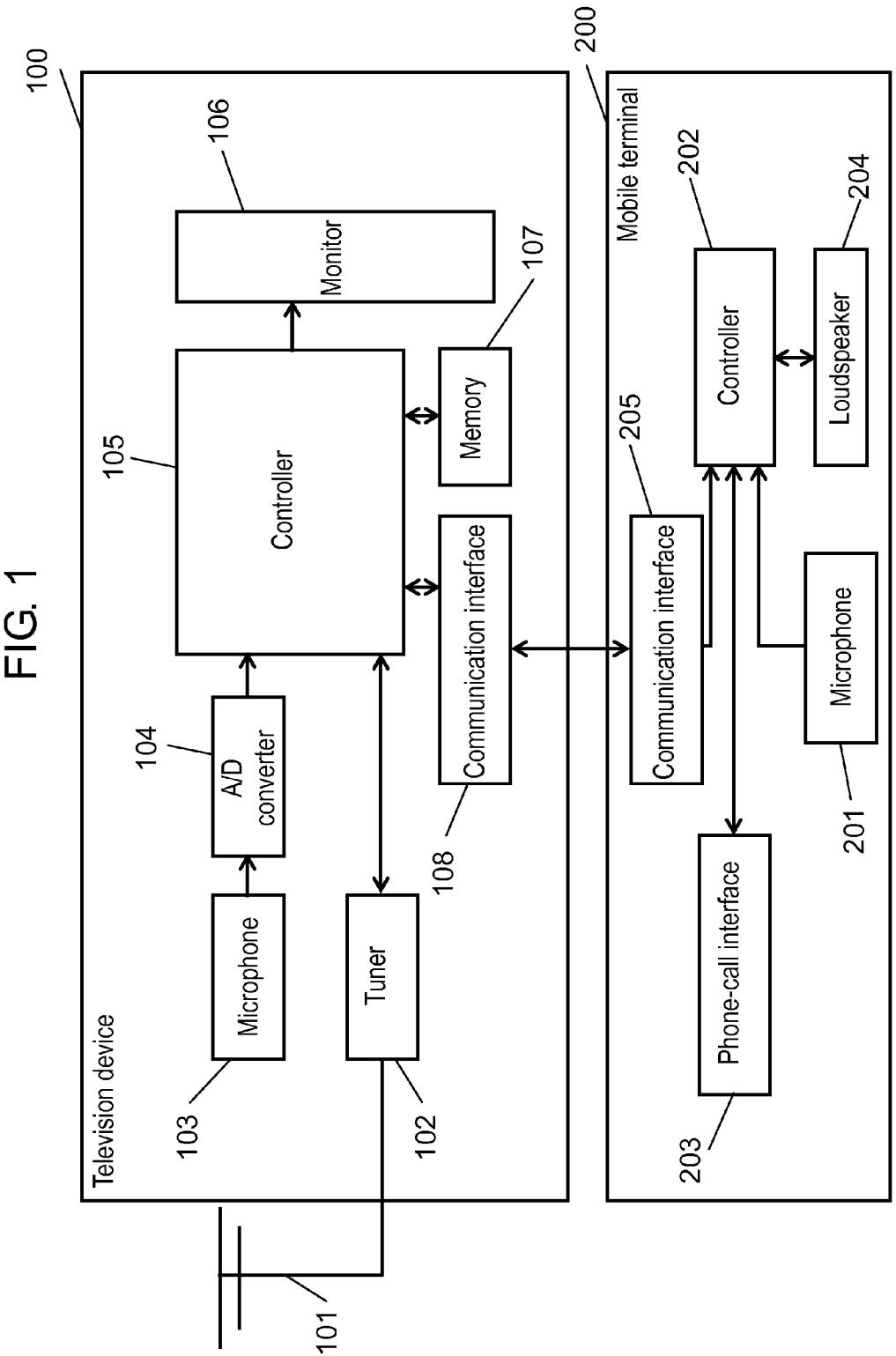
FIG. 1 is a block diagram for explaining an electric configuration of an entire system.

An outline of a system according to the present embodiment will be described below with reference to FIG. 1. FIG. 1 is a block diagram showing an electric configuration of the system according to the embodiment.

The system according to the present embodiment includes television device 100 and mobile terminal 200. Television device 100 includes microphone 103. Television device 100 accepts a designation by voice from a user through microphone 103. Television device 100 analyzes the voice accepted from the user, determines contents of the designation corresponding to an analysis result, and controls its own device based on a determination result.

However, when voice representing a designation of a user is small, television device 100 may not be able to accurately determine the contents of the designation from the user.

Therefore, television device 100 includes communication interface 108, microphone 103, and controller 105. Communication interface 108 communicates with mobile terminal 200. Microphone 103 collects sound to produce audio data. Controller 105 analyzes the audio data produced by microphone 103, determines contents of a designation corresponding to an analysis result, and controls its own device based on a determination result. When the contents of the designation corresponding to the analysis result cannot be determined, controller 105 controls its own device to urge a user to use mobile terminal 200.

In this manner, television device 100 can recommend an alternative means for a user even in a situation in which voice recognition cannot be accurately performed.

[1-2. Electric Configuration]

An electric configuration of a system according to the present embodiment will be described below with reference to FIG. 1. As described above, the system according to the present embodiment includes television device 100 and mobile terminal 200. Television device 100 includes antenna 101, tuner 102, microphone 103, A/D converter 104, controller 105, monitor 106, memory 107, and communication interface 108.

Antenna 101 receives digital broadcasting. Tuner 102 extracts digital broadcasting of a channel selected by a user from digital broadcasting received through antenna 101. Tuner 102 produces a video stream based on the extracted digital broadcasting. Microphone 103 collects sound surrounding television device 100 and converts the sound into an analog audio signal. A/D converter 104 amplifies the audio signal input from microphone 103 and converts the audio signal into digital audio data.

Controller 105 is a control unit that controls the whole of television device 100. For example, controller 105 is configured by a semiconductor chip. Controller 105 performs various processing on the video stream acquired from tuner 102 and the digital audio data acquired from A/D converter 104. For example, controller 105 performs decoding processing to the video stream acquired from tuner 102. Controller 105 executes echo cancellation serving as processing of removing an audio component output from a loudspeaker (not shown) built in television device 100 on the digital audio data acquired from A/D converter 104. Controller 105 executes digital filter processing serving as processing of removing noise on the digital audio data acquired from A/D converter 104. Controller 105 analyzes the digital audio data to which echo cancellation and the digital filter processing are executed, and executes voice recognition processing to determine contents of a designation corresponding to an analysis result. For example, controller 105 determines whether the designation corresponding to the analysis result is a designation to switch channels of television device 100, a designation for volume adjustment, or a designation to input a character string of a search keyword on a Web browser.

Monitor 106 displays an image represented by decoded image data acquired from controller 105. For example, monitor 106 is configured by a liquid crystal panel.

Memory 107 stores various pieces of information therein. For example, memory 107 is configured by a flash memory. Memory 107 stores, for example, a control program to control the whole of television device 100 and dictionary data used in the voice recognition processing. The dictionary data mentioned herein is a set of typical audio data representing various designations to television device 100. Controller 105 calculates a degree of similarity between audio data produced based on voice input by a user and audio data included in the dictionary data. Controller 105 executes voice recognition processing if determined that a designation having a high degree of similarity is made by a user.

Communication interface 108 establishes communication with mobile terminal 200 to transmit/receive data. For example, communication interface 108 is configured by a Wi-Fi (registered trademark) module.

The mobile terminal 200 includes microphone 201, controller 202, phone-call interface 203, loudspeaker 204, and communication interface 205. Microphone 201 collects sound surrounding mobile terminal 200 and produces digital audio data. Controller 202 is a control unit that controls the whole of mobile terminal 200. For example, controller 202 is configured by a semiconductor chip. Phone-call interface 203 is a module to communicate via telephone with a telephone base station. For example, phone-call interface 203 is configured by a 3G communication module. Loudspeaker 204 outputs sound. A user inputs voice through microphone 201 during telephone communication and listens to voice output by an intended party through loudspeaker 204. Communication interface 205 establishes communication with television device 100 to transmit/receive data. For example, communication interface 108 is configured by a Wi-Fi (registered trademark) module.

[1-3. Operation]

[1-3-1. Operation in Active State]

Figure 2:
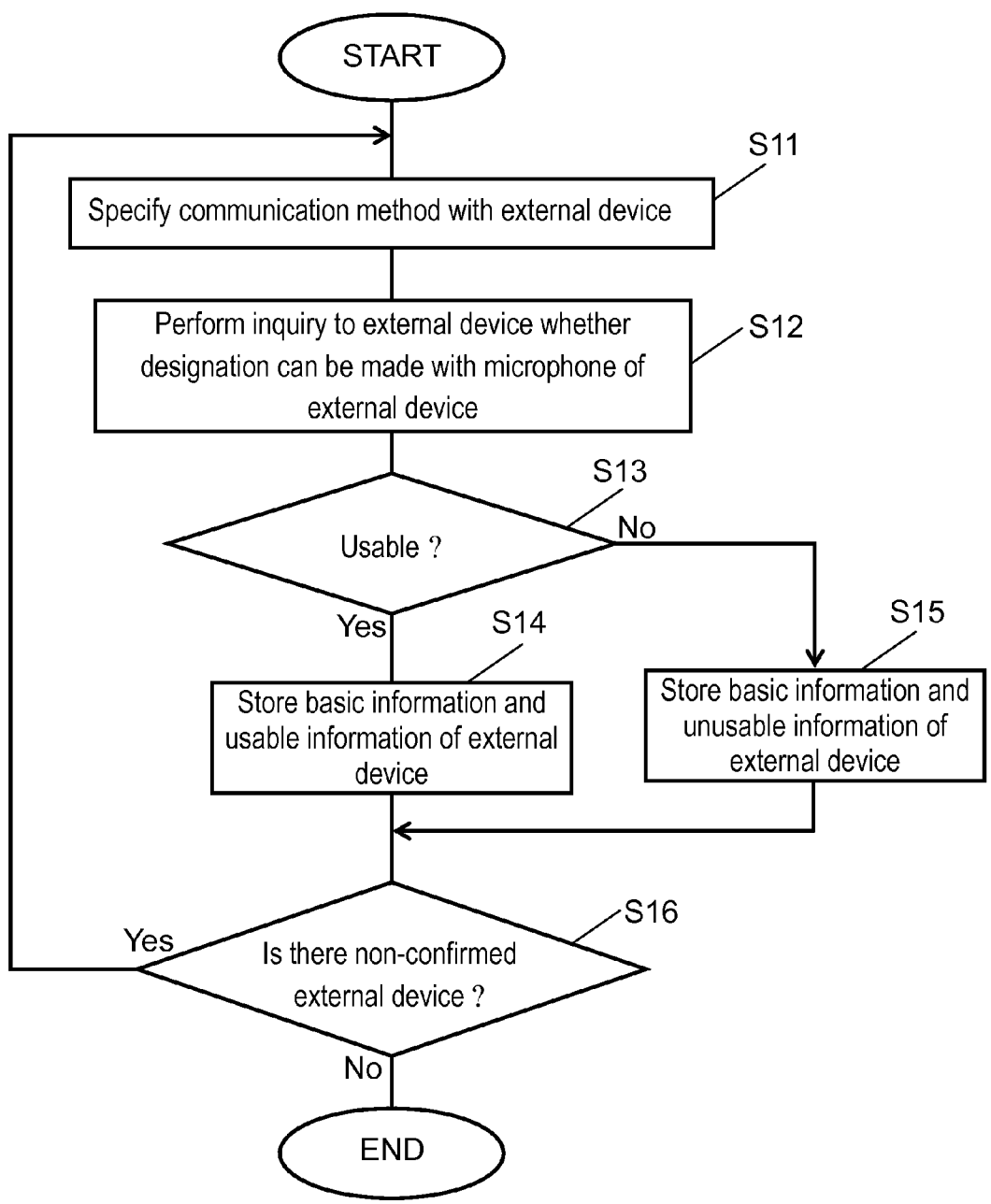

An operation in an active state of television device 100 will be described with reference to FIG. 2. FIG. 2 is a flow chart for explaining the operation in an active state of television device 100.

When the power supply of television device 100 is turned on, controller 105 is activated. When controller 105 is activated, control of the flow chart shown in FIG. 2 is started. Controller 105 specifies a communication method by which television device 100 is connected to mobile terminal 200 through communication interface 108 (S11). For example, controller 105 specifies whether a connection method between television device 100 and mobile terminal 200 is a connection method by a wireless LAN, a connection method by a wired LAN, or the like.

When the communication method is specified, controller 105 performs an inquiry to mobile terminal 200 whether television device 100 can be designated by using microphone 201 (S12). More specifically, controller 105 performs an inquiry to mobile terminal 200 whether a voice recognition application is installed in mobile terminal 200 or about basic information or the like of mobile terminal 200. The voice recognition application herein is an application that, when a voice input is accepted, produces digital audio data from the acquired voice, transmits the produced digital audio data to a host device such as television device 100, and causes the host device to perform voice recognition. The basic information of mobile terminal 200 includes a machine name of mobile terminal 200, an IP address, a MAC address, information representing a format of digital audio data transmitted by mobile terminal 200, and the like.

As a result of the inquiry, when an answer is acquired from mobile terminal 200 through communication interface 108, controller 105 determines whether mobile terminal 200 notifies television device 100 of a designation by using microphone 201 (S13). For example, when a voice recognition application is installed in mobile terminal 200, controller 105 determines that television device 100 can be notified of the instruction by using microphone 201.

When it is determined that television device 100 is notified of the designation by using microphone 201 (Yes in step S13), controller 105 stores the basic information of mobile terminal 200 and information representing that television device 100 can be notified of the designation by using microphone 201 in memory 107 (S14). On the other hand, when it is determined that television device 100 is not notified of the designation by using microphone 201 (No in step S13), controller 105 stores the basic information of mobile terminal 200 and information representing that television device 100 cannot be notified of the designation by using microphone 201 in memory 107 (S15).

Upon completion of the processing in step S14 or the processing in step S15, controller 105 determines whether there is an external device that has not been confirmed (S16). When the presence of all the external devices are confirmed (No in step S16), controller 105 drops out of the processing in the flow chart in FIG. 2. On the other hand, when it is determined that there is an external device that has not been confirmed (Yes in step S16), controller 105 repeats the processing subsequent to step S11.

[1-3-2. Operation Performed upon Acceptance of Designation by Voice]

Figure 3:
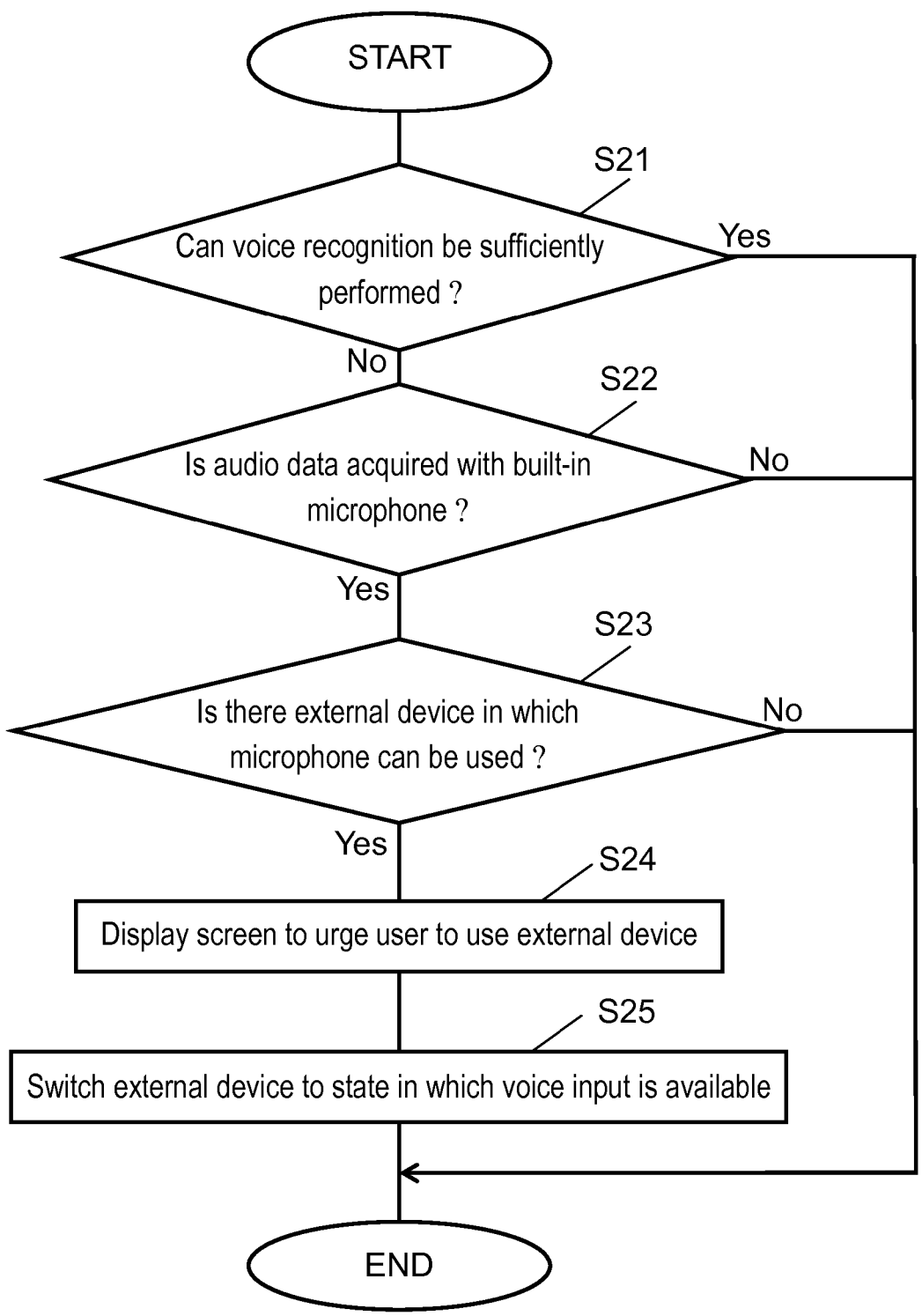
FIG. 3 is a flow chart for explaining an operation of the television device when an operation designation is accepted by voice.
Figure 4:
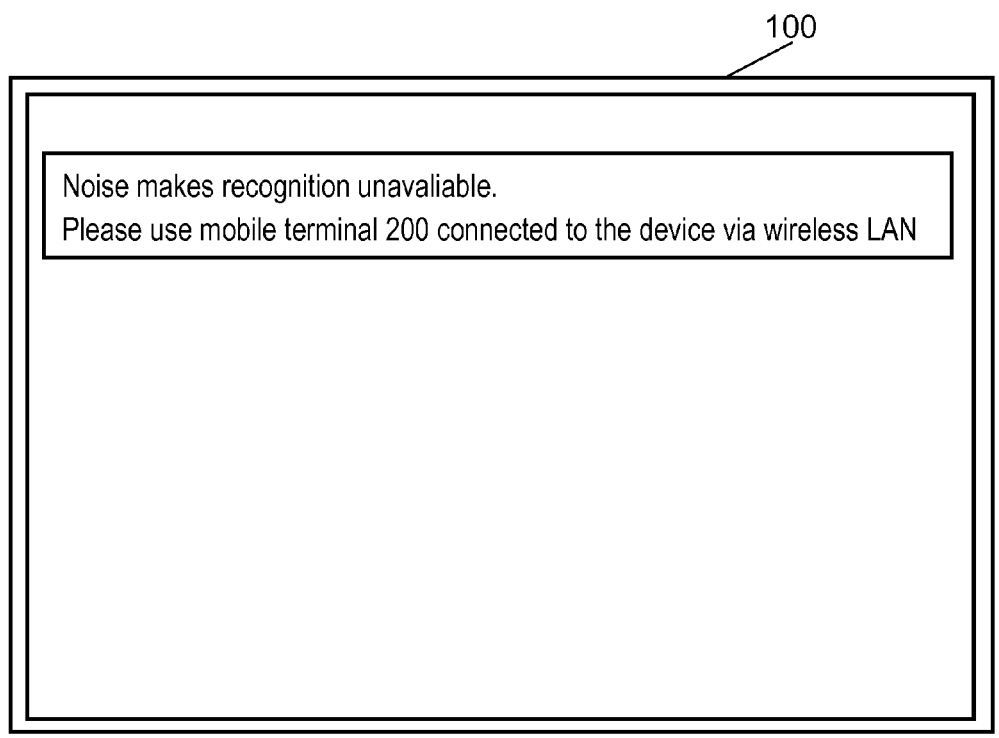
FIG. 4 is a schematic diagram for explaining an example of a display screen of the television device.
Figure 5:
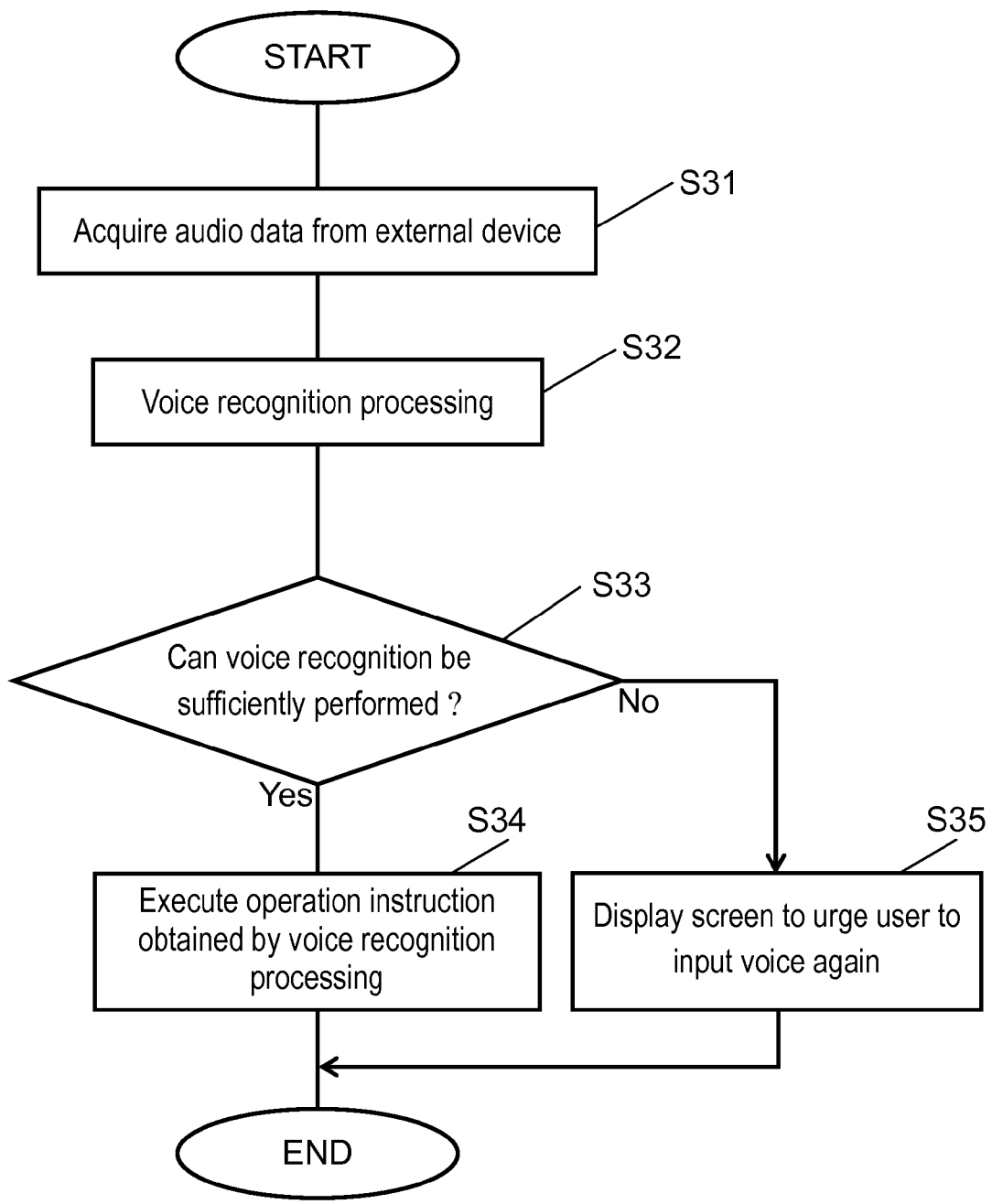
FIG. 5 is a flow chart for explaining an operation of the television device when a designation is accepted by acquiring audio data from an external device.

An operation performed when television device 100 accepts a designation by voice from a user will be described with reference to FIGS. 3 to 5. FIG. 3 is a flow chart for explaining an operation of television device 100 when a designation is accepted by voice from a user. FIG. 4 is a schematic diagram for explaining an example of a display screen of television device 100. FIG. 5 is a flow chart for explaining an operation of television device 100 when a designation is accepted by acquiring audio data from mobile terminal 200.

Upon completion of the operation in the activation state, when a designation is made by voice from a user, processing according to the flow chart shown in FIG. 3 is started. When a designation by voice is accepted from the user through microphone 103, controller 105 determines whether voice recognition can be sufficiently performed (S21). More specifically, controller 105 compares digital audio data acquired through microphone 103 with various audio data included in the dictionary data stored in memory 107 to determine whether there is audio data that is similar to the various audio data at a predetermined level or more or to determine whether the volume of digital audio data acquired through microphone 103 is a predetermined level or more.

When it is determined that sufficient voice recognition cannot be performed (No in step S21), controller 105 determines whether digital audio data serving as an object of voice recognition is acquired through microphone 103 (S22).

When it is determined that the digital audio data is acquired through microphone 103 (Yes in step S22), controller 105 determines whether an external device in which a microphone can be used is present around controller 105 (S23). More specifically, controller 105 refers to information stored in memory 107 and representing that television device 100 can be notified of a designation by using a microphone to determine whether an external device in which a microphone can be used is present around controller 105.

It is determined that the external device in which a microphone can be used is present around controller 105 (Yes in step S23), controller 105 controls monitor 106 to display a screen that urges a user to use the external device (S24). More specifically, monitor 106 displays a screen as shown in FIG. 4.

When the screen as shown in FIG. 4 is displayed on monitor 106, controller 105 switches modes of mobile terminal 200 such that television device 100 can be notified of a designation through microphone 201 (S25). For example, controller 105 notifies mobile terminal 200 of a command to activate the voice recognition application installed in mobile terminal 200 through communication interface 108.

In this state, television device 100 consequently waits until television device 100 accepts a designation by audio data from mobile terminal 200. When television device 100 accepts the designation by audio data from mobile terminal 200, processing according to the flow chart shown in FIG. 5 is started.

Controller 105 acquires digital audio data from mobile terminal 200 through communication interface 108 (S31). When the digital audio data is acquired, controller 105 executes voice recognition processing on the acquired digital audio data (S32). When the voice recognition processing is executed, controller 105 determines whether the voice recognition can be sufficiently executed (S33). More specifically, controller 105 analyzes the acquired digital audio data to determine whether contents of a designation corresponding to an analysis result can be determined.

When it is determined that voice recognition can be sufficiently executed (Yes in step S33), controller 105 controls television device 100 to perform an operation according to contents of a designation corresponding a determined analysis result (S34). On the other hand, when it is determined that the voice recognition cannot be sufficiently executed (No in step S33), controller 105 controls monitor 106 to display a screen so as to urge a user to input voice again (S35).

[1-4. Effects or the Like]

As described above, television device 100 according to the present embodiment includes communication interface 108, microphone 103, and controller 105. Communication interface 108 communicates with mobile terminal 200. Microphone 103 collects sound to produce audio data. Controller 105 analyzes the audio data produced by microphone 103, determines contents of a designation corresponding to an analysis result, and controls its own device based on a determination result. When the contents of the designation corresponding to the analysis result cannot be determined, controller 105 controls its own device to urge a user to use mobile terminal 200.

In this manner, television device 100 can recommend an alternative means for a user to input a designation with mobile terminal 200 even in a situation in which voice recognition cannot be accurately performed.

Mobile terminal 200 includes microphone 201. In television device 100, when the contents of the designation corresponding to the analysis result cannot be determined, controller 105 controls television device 100 to urge a user to use microphone 201.

In this manner, television device 100 can recommend an alternative means for a user to input a designation with microphone 201 provided in mobile terminal 200 even in a situation in which voice recognition cannot be accurately performed.

Television device 100 further includes monitor 106 that displays an image. In television device 100, when the contents of the designation corresponding to the analysis result cannot be determined, controller 105 controls monitor 106 to display a message to urge a user to use mobile terminal 200.

In this manner, television device 100 can visually recommend an alternative means for a user to input a designation with microphone 201 provided in mobile terminal 200 even in a situation in which voice recognition cannot be accurately performed.

In television device 100, when the contents of the designation corresponding to the analysis result cannot be determined, controller 105 controls communication interface 108 to transmit a command to mobile terminal 200 for setting mobile terminal 200 to a mode in which microphone 201 can be used.

In this manner, television device 100 can automatically activate mobile terminal 200 while recommending an alternative means for a user to input a designation with microphone 201 provided in mobile terminal 200, even in a situation in which voice recognition cannot be accurately performed.

Another Embodiment

As described above, as an illustration of the technique disclosed in this application, the first embodiment has been described. However, the technique in the present disclosure can be applied to not only the embodiment but also an embodiment to which change, replacement, addition, omission, and the like are appropriately performed.

Thus, another embodiment will be illustrated below.

Figure 6:
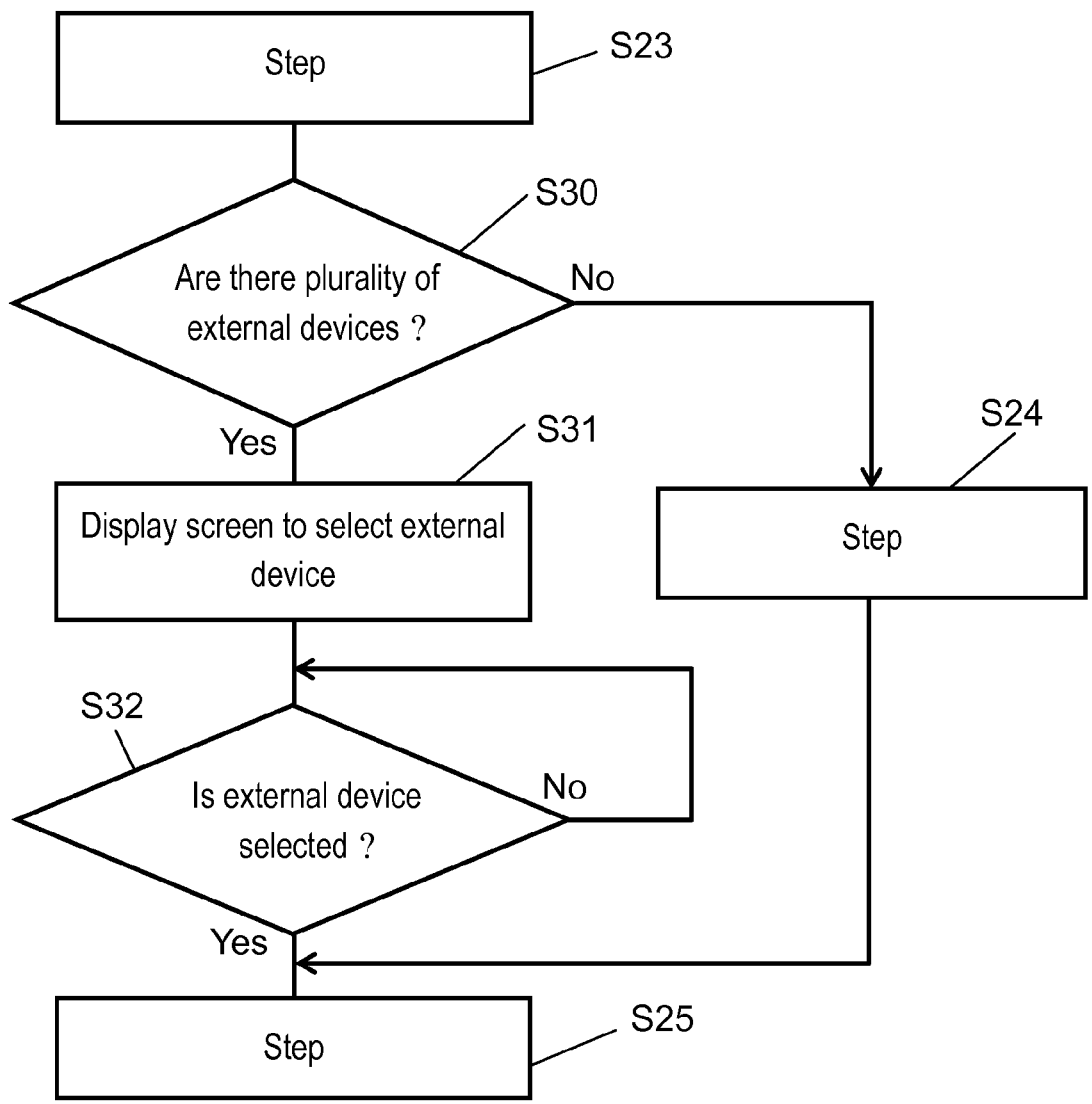
FIG. 6 is a flow chart for explaining an operation of a television device according to another embodiment.

In the first embodiment, in step S23 in FIG. 3, when it is determined that there is an external device in which a microphone can be used, a screen as shown in FIG. 4 is displayed. However, the configuration is not necessarily limited thereto. For example, when controller 105 determines in step S23 that there is an external device in which a microphone can be used, control as shown in the flow chart in FIG. 6 may be started. In this case, when it is determined that the external device in which a microphone can be used is present, controller 105 determines whether there are a plurality of external devices in which microphones are used (S30). When it is determined that the plurality of external devices are present (Yes in step S30), controller 105 controls monitor 106 to display a screen as shown in FIG. 7 that causes a user to select any one of the plurality of external devices (S31). When the screen as shown in FIG. 7 is displayed on monitor 106, controller 105 waits until the external device is selected (S32). When the external device is selected (Yes in step S32), a command to activate a voice recognition application installed in the selected external device is transmitted to the selected external device through communication interface 108 (S25).

In this manner, when a plurality of external devices are present around television device 100, a situation in which the voice recognition applications are automatically activated in all the external devices can be avoided.

In addition, for example, television device 100 according to the first embodiment may be configured to store a voice pattern of a specific individual in association with an external device, analyze a voice pattern of digital audio data acquired through microphone 103, and transmit a command to activate a voice recognition application to an external device stored in association with the analyzed voice pattern.

In this manner, when voice recognition cannot be sufficiently performed, television device 100 can automatically activate a voice recognition application installed in an external device owned by a person who utters voice.

In the first embodiment, it is assumed that, when the digital audio data acquired through microphone 103 cannot be sufficiently recognized as voice, television device 100 displays the screen as shown in FIG. 4. However, the configuration is not necessarily limited thereto. For example, when digital audio data acquired through microphone 103 cannot be sufficiently recognized as voice, television device 100 may display a screen that urges a user to use a normal remote controller without using a method of voice recognition.

As described above, as an illustration of the technique in the present disclosure, the embodiment is described. For this purpose, the accompanying drawings and the detailed description are provided.

Thus, the constituent elements described in the accompanying drawings and the detailed description can include not only constituent elements that are required to solve the problems but also constituent elements that are not required to solve the problems to illustrate the above technique. Accordingly, even when the optional constituent elements are described in the accompanying drawings and the detailed description, it not should be immediately concluded that the optional constituent elements are necessary.

Since the above embodiments illustrate the technique in the present disclosure, various changes, replacements, additions, and omissions can be executed in the scope of claims or a scope equivalent thereto.

The technique in the present disclosure can be applied to a voice recognition device such as a television device, a DVD recorder, and an audio player that accepts a designation by voice.

What is claimed is:

1. A voice recognition device comprising:
   a communication interface that communicates with an external device;
   a first microphone that collects sound to produce audio data; and
   a controller that analyzes the audio data produced by the first microphone, determines contents of a designation corresponding to an analysis result, and then controls its own device based on a determination result, and yet controls its own device to urge a user to use the external device when the contents of the designation corresponding to the analysis result cannot be determined.

2. The voice recognition device according to claim 1, wherein the external device further includes a second microphone, and
   the controller controls its own device to urge a user to use the second microphone when the contents of the designation corresponding to the analysis result cannot be determined.

3. The voice recognition device according to claim 1, further comprising:
   a monitor that displays an image,
   wherein the controller controls the monitor to display a message to urge a user to use the external device when the contents of the designation corresponding to the analysis result cannot be determined.

4. The voice recognition device according to claim 2, wherein the controller, when the contents of the designation corresponding to the analysis result cannot be determined, controls the communication interface to transmit a command to the external device to set the external device to a mode in which the second microphone can be used.

5. A voice recognition method comprising:
   communicating with an external device;
   collecting sound to produce audio data; and
   analyzing the audio data to determine contents of a designation corresponding to an analysis result, and then controlling the device based on a determination result, and yet, urging a user to use the external device when the contents of the designation corresponding to the analysis result cannot be determined.

6. The voice recognition method according to claim 5, wherein when the contents of the designation corresponding to the analysis result cannot be determined, a user is urged to use a microphone included in the external device.

7. The voice recognition method according to claim 5, wherein when the contents of the designation corresponding to the analysis result cannot be determined, a message to urge a user to use the external device is displayed.

8. The voice recognition method according to claim 6, wherein when the contents of the designation corresponding to the analysis result cannot be determined, a command to set the external device to a mode in which the microphone can be used is transmitted to the external device.

* * * * *